(12) United States Patent
Jackman

(10) Patent No.: US 8,807,280 B2
(45) Date of Patent: Aug. 19, 2014

(54) MULTI-DIRECTIONAL TRANSPORT DEVICE FOR SCAFFOLDING

(76) Inventor: John Jackman, Southampton, NY (US)

(*) Notice: Subject to any disclaimer, the term of this patent is extended or adjusted under 35 U.S.C. 154(b) by 946 days.

(21) Appl. No.: 12/587,794

(22) Filed: Oct. 13, 2009

(65) Prior Publication Data

US 2011/0085884 A1    Apr. 14, 2011

(51) Int. Cl.
 *E04G 5/02* (2006.01)
(52) U.S. Cl.
 USPC ............... 182/129; 182/39; 16/42 R
(58) Field of Classification Search
 USPC .......... 182/39, 129; 16/42 R; 248/188, 188.1, 248/188.4, 188.8, 188.9, 189.91
 See application file for complete search history.

(56) References Cited

U.S. PATENT DOCUMENTS

| | | | |
|---|---|---|---|
| 757,519 A | | 4/1904 | Turnbull |
| 1,981,728 A * | | 11/1934 | Harris .................... 16/42 R |
| 2,273,124 A * | | 2/1942 | McDaniels ............. 182/39 |
| 2,987,855 A | | 6/1961 | Singleton et al. |
| 3,177,619 A | | 4/1965 | Benjamin |
| 3,183,545 A * | | 5/1965 | Bergstrom .............. 16/42 R |
| 3,363,379 A | | 1/1968 | Curran |
| 3,623,184 A * | | 11/1971 | Mazur .................... 16/42 R |
| 3,883,923 A * | | 5/1975 | England ................. 16/42 R |
| 4,422,212 A * | | 12/1983 | Sheiman et al. ........... 16/29 |
| 4,453,364 A | | 6/1984 | Ting |
| 4,826,118 A * | | 5/1989 | Swinderman ............ 248/188.9 |
| 5,106,109 A * | | 4/1992 | Tattersall et al. ............ 280/9 |
| 5,279,387 A * | | 1/1994 | Swiderski et al. ......... 182/27 |
| 5,417,302 A * | | 5/1995 | McElfresh ............... 182/108 |
| 5,427,342 A * | | 6/1995 | Gagnon .................. 248/188.9 |
| 5,704,624 A * | | 1/1998 | Davis ..................... 280/47.34 |
| 5,782,444 A * | | 7/1998 | Anderman et al. ........ 248/188.8 |
| 5,802,669 A * | | 9/1998 | Wurdack ................. 16/42 R |
| 5,984,360 A * | | 11/1999 | Edwards et al. .......... 280/845 |
| 6,042,122 A * | | 3/2000 | Mohr ..................... 280/9 |
| 6,145,795 A * | | 11/2000 | McAdam et al. ......... 248/146 |
| 6,206,424 B1 * | | 3/2001 | Edwards et al. .......... 280/845 |
| 6,464,256 B1 * | | 10/2002 | Edwards ................. 280/845 |
| 6,655,497 B1 * | | 12/2003 | Weatherall .............. 182/108 |
| 6,722,471 B2 | | 4/2004 | Wolfe |
| 6,728,991 B2 * | | 5/2004 | Lai et al. ................. 16/19 |
| 6,901,629 B2 * | | 6/2005 | Wurdack ................. 16/42 R |
| 6,926,293 B1 * | | 8/2005 | Pope ...................... 280/79.11 |
| 6,981,294 B2 * | | 1/2006 | Edwards ................. 16/42 R |
| 7,028,808 B2 * | | 4/2006 | Zeaman .................. 182/108 |
| 7,614,114 B1 * | | 11/2009 | Bucher et al. ............ 16/30 |

* cited by examiner

*Primary Examiner* — Alvin Chin-Shue
*Assistant Examiner* — Colleen M Chavchavadze
(74) *Attorney, Agent, or Firm* — Thomas A. O'Rourke; Bodner & O'Rourke, LLP

(57) ABSTRACT

A multi-directional scaffold transport device, which may be attached to each base of a scaffold's legs, provides increased mobility in relation to movement atop corrugated floor decking with vertical anchor studs used in conventional steel I-beam superstructures. The device comprises an elongated flat plate with angled extensions. The angled extensions may form a trapezoidal shape, or more preferably a triangular shape, and may be curved or have compound curvature to enable deflection of the device to either side of any anchor stud encountered, rather than jamming thereon. The elongated flat plate may have minimal length sufficient to normally receive support from at least two peaks of the corrugated decking. The device may incorporate threaded studs protruding from the elongated flat plate, which may be received by holes in the base of the scaffold, and be removeably fastened thereto using nuts. The device may also incorporate vertical walls for increased stiffness.

16 Claims, 4 Drawing Sheets

MULTI-DIRECTIONAL TRANSPORT DEVICE FOR SCAFFOLDING

FIELD OF THE INVENTION

The present invention relates to improvements in construction devices and methods, and more particularly to devices and methods that improve the functionality of scaffolding typically used in construction and remodeling.

BACKGROUND OF THE INVENTION

Scaffolding has many uses, particularly for the construction and maintenance of buildings. A scaffold assembly can be used as a single tier, but is usually formed to allow stacking of the scaffold assembly so that many tiers may be joined to provide workers with the ability to reach great heights above the ground or above a particular floor in a building. Very often, the tiers of a scaffold may be so high that they must be tied to a building to prevent accidents. Several tiers of scaffolding being so stacked can become unstable, which may be exacerbated by the movements of the workers, by high winds, and by other natural and man-made factors.

But when scaffolds are used during the construction process within a building utilizing steel I-beam construction, stability does not generally pose a serious problem, and instead, mobility is a factor to be considered. The mobility of the scaffold may adversely impact productivity, even where the scaffold assembly might only be one or two tiers high, while working on an individual floor of a modern building. The scaffolding would therefore not need to be tied to a wall, and conversely may need to be constantly relocated to various positions throughout the building's floor.

The worker's productivity may be limited by mobility, due to the methodology utilized in steel I-beam construction. The initial phase of construction for the building often involves the substructure, in which piles may be driven down to reach bedrock, alternatively, shafts may be drilled, into which steel reinforcing rods are inserted, and the shafts are then filled with concrete. A foundation platform consisting of reinforced concrete is then poured above the support columns. Rising up from the foundation platform is the superstructure. A common method of forming the building's superstructure for modern office buildings and skyscrapers involves erecting steel I-beam columns, to which are attached steel girders and cross-beams that form a steel skeleton.

Steel Decking is then attached to the horizontal I-beams, usually being welded in place. The decking typically consists of panels of thin corrugated steel. An early example of the steel decking that may be used is illustrated in FIG. 5 of U.S. Pat. No. 757,519 to Turnbull, which has "cylindric corrugations." A later example is shown by U.S. Pat. No. 4,453,364 to Ting which generally has flat surfaces-peaks, valleys, and sloping webs that form trapezoidal corrugations.

It has been known for some time, in the art of construction, to attach anchor studs to steel I-beams to serve as a shear transfer element, which is shown by U.S. Pat. No. 2,987,855 to Singleton. Singleton also shows use of steel decking that has wave-like corrugations, and which appear more sinusoidal than cylindric. It is also quite common to weld steel anchor studs to the decking at the I-beam locations, with one such approach being shown by U.S. Pat. No. 3,363,379 to Curran. Generally, at some optimum point in the construction sequence thereafter, concrete is poured over the corrugated decking and anchor studs to establish the particular floor of the building. However, before the concrete is actually poured, and after the decking and the studs have been secured to provide a stable platform, many other steps are performed to facilitate the overall construction of each floor, including installation of diagonal side bracing, which requires use of scaffolding.

At this point in the construction, the scaffolding must be placed atop the steel decking in a manner that makes it stable, despite only having periodic support from the corrugations. It is not uncommon to bolt the base plates of the scaffold shown in FIG. 7, to a series of wood planks which may form a rectangular base. But the scaffold then must be lifted and carried from position to position about the decking, which might require removal of the wood planks in order to reduce the weight of the scaffold assembly being transported.

The multi-directional transport device disclosed herein may be attached to each base of a typical scaffold, to provide a more efficient means of relocating the scaffolding about the decking without use of wood planking, and without the need to lift and carry the assembly, possibly eliminating the need for the assistance of a second worker.

OBJECTS OF THE INVENTION

It is an object of the invention to provide a means for supporting a scaffold assembly on the corrugated steel decking of a building's I-beam superstructure.

It is also an object of the invention to provide a means of stabilizing a scaffold assembly when being utilized atop the corrugated steel decking of a building's I-beam superstructure.

It is another object of the invention to provide a scaffold support device that can remain affixed to the scaffold during its transportation.

It is a further object of the invention to provide a device which may increase the mobility of a scaffold assembly while being utilized atop the corrugated steel decking of a building's I-beam superstructure.

It is another object of the invention to provide a device which may be attached to the base of a scaffold assembly and permit the scaffold to slide across the corrugations of the steel decking of a buildings sub-floor.

SUMMARY OF THE INVENTION

The present invention is directed to providing improved mobility to a typical scaffold assembly being utilized in the maintenance of buildings or at building construction sites. A conventional scaffold assembly is shown in FIG. 7, and typically has a plurality of legs to provide support, which usually terminate in a flat base in order to provide stability. Where the scaffold is principally utilized in a single location for a substantial period of time, scaffold mobility is not a significant factor. However, where scaffolding is utilized on individual floors of a new multi-story building, mobility may be an important factor, as it may affect productivity. This is especially true where the building is constructed using a standard I-beam superstructure with corrugated floor decking having vertical anchor studs.

To facilitate increased mobility of a construction scaffold in that scenario, and thereby increase productivity, the multi-directional scaffold device herein disclosed may be attached to the scaffold's legs. The device comprises an elongated flat plate with an angled extension at respective ends of the flat plate. The length of the elongated flat plate may be chosen to always obtain support from at least two peaks of the corrugated steel decking. The angled extensions may be have a trapezoidal shape, or may alternatively have a triangular shape. The angled extensions may also be flat, or they may alternatively curve upwards. They may additionally have curvature in two directions, resulting in a compound curved surface. These variations for the angled extensions may be incorporated to provide a means of having tangential contact of the multi-directional transport device with the anchor studs of the floor deck, and thereby greatly reduce the possibility of jamming on an anchor stud due to direct contact from a flat surface, which would impede ease of scaffold movement by a single worker.

The multi-directional scaffold device may have vertical walls incorporated into it to provide stiffness, which may be necessary where the scaffold being supported will be very heavy. These walls may comprise integral stiffeners, or may alternatively be separate flanges which are welded to the elongated flat plate and angled extensions. The stiffeners may also be in the form of other geometric shapes, such as an angle, which may be fastened, rather than welded, to the elongated flat plate and angled extensions.

To facilitate attachment of the multi-directional transport device to the scaffold, the device may incorporate threaded studs that protrude vertically from the top of the elongated flat plate. Holes may be drilled in the flat base of the scaffold legs to receive the studs, and nuts may then be threaded onto the studs to removeably attach the device to the scaffold.

DETAILED DESCRIPTION OF THE INVENTION

Figure 1:
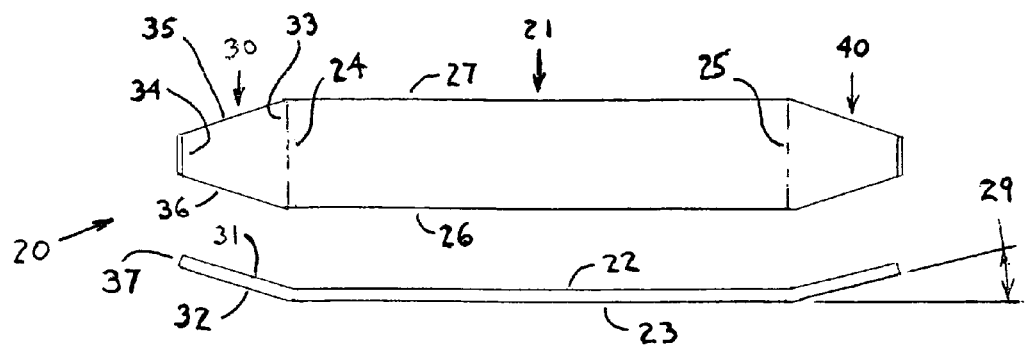
FIG. 1 is a top view and side view of a first embodiment of the multi-directional scaffold transport device.

FIG. 1 shows a first embodiment of the multi-directional scaffold transport device 20 of the present invention. The multi-directional scaffold transport device 20 may be constructed of any appropriate material, including, but not limited to, aluminum, steel, titanium, brass, phenolic, plastic, or wood. The multi-directional scaffold transport device 20 may be formed from sheet metal comprised of multiple bends, or it may be an assembly of parts fastened or welded together, or it may be a casting, or a machined part. The method of manufacture and the material utilized to produce the device may be determined by the manufacturer, and may be specially selected to suit the particular scaffolding and building site.

The multi-directional scaffold transport device 20 in FIG. 1 may be comprised of an elongated flat plate 21, which may be defined as having a top surface 22, a bottom surface 23, which may be substantially flat, a first end 24, a second end 25, a first side 26, and a second side 27. In a preferred embodiment the first end 24 and second end 25 are generally parallel to each other, and first side 26 and second side 27 are also generally parallel to each other, to generally form a rectangular-shaped plate. The length of the first side 26 and second side 27 are approximately equal, and each of which may be several times longer than the length of first end 24 and second end 25, which themselves are approximately equal to each other in length.

Extending from first end 24 may be a first angled extension plate 30. First angled extension plate 30 may be integral to first end 24 of elongated flat plate 21, and thus may simply be a bent up sheet metal flange extending therefrom, or alternatively it may be mechanically fastened onto or welded to first end 24 of elongated flat plate 21. A second angled extension plate 40 may extend from second end 25 just the same as is herein described for first angled extension plate 30 extending from first end 24.

First angled extension plate 30 may be described as having a top 31, a bottom 32, a fixed end 33, an elevated end 34, a first tapered side 35, and a second tapered side 36. In a preferred embodiment, first tapered side 35 and second tapered side 36 both angle towards each other, so that the width of the plate narrows in moving from fixed end 33 to elevated end 34. In one embodiment, first tapered side 35 and said second tapered 36 side may terminate on a flat edge surface 37 at elevated end 34, for both the first and second angled extension plates 30 and 40. Where the flat edge surface 37 is formed to be parallel to the fixed end 33, the first angular extension plate and second angular extension plate will each roughly have a trapezoidal shape.

First angled extension plate 30 may be a flat plate such that top 31 and bottom 32 are planar and parallel to each other (FIG. 1). In a preferred embodiment, first angled extension plate 30 may be flat and so formed to create acute angle 29 relative to the top surface 22 and bottom surface 23 of elongated flat plate 21.

Figure 5:
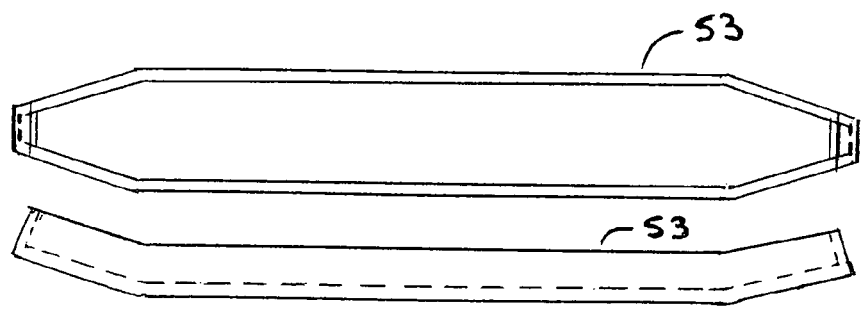
FIG. 5 is a top view and side view of a fifth embodiment of the multi-directional scaffold transport device.
Figure 7:
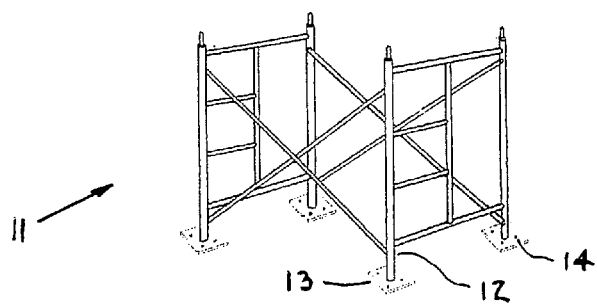
FIG. 7 is a perspective view of a typical construction scaffold.

The length of the elongated flat plate 21 of the multi-directional scaffold transport device 20 may preferably be sized to span between the peaks of the corrugations of the floor decking shown in FIG. 5 of U.S. Pat. No. 757,519 to Turnbull, or as shown in FIG. 5 of U.S. Pat. No. 3,177,619 to Benjamin, or those in FIG. 2 of U.S. Pat. No. 3,363,379 to Curran. Although the spacing of the peaks of the corrugations used today for the floor decking may vary from building to building, corrugations with a six inches spacing is quite common. Therefore the length of flat plate 21 may, in that instance, be approximately twelve inches or slightly longer, so that when it is attached to the base 13 of a scaffold assembly 11 (FIG. 7), which is being maneuvered across the floor deck's corrugations, the device will always be supported by at least two peaks. This will be the case where the decking has trapezoidal corrugations offering more stable support from its flat peak surfaces, or the wave-like corrugations. However, the length may be modified to be shorter or longer to suit less common spacing between corrugations, or similar obstacles in other applications.

Figure 3:
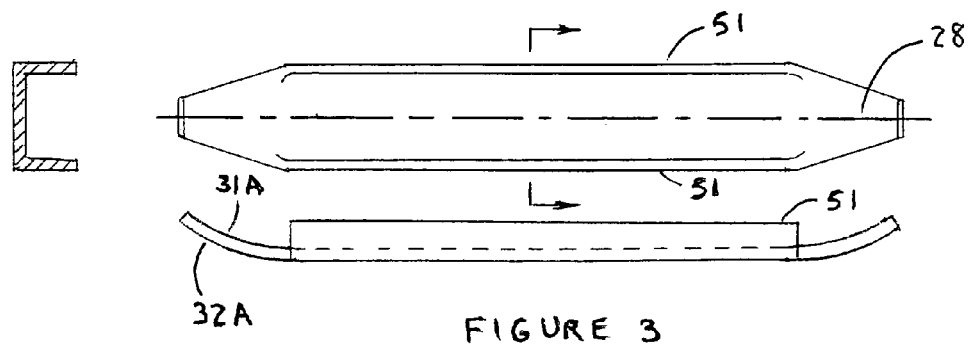
FIG. 3 is a top view, side view, and section cut through a third embodiment of the multi-directional scaffold transport device.
Figure 2:
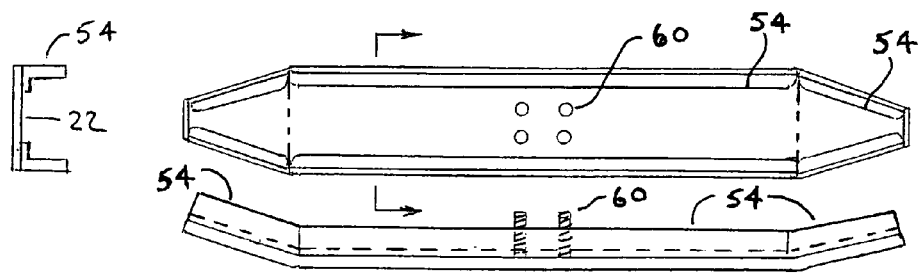
FIG. 2 is a top view, side view, and section cut through a second embodiment of the multi-directional scaffold transport device, shown with threaded studs.
Figure 4:
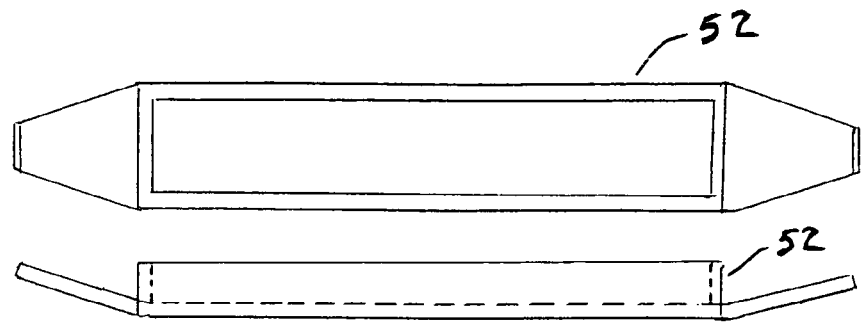
FIG. 4 is a top view and side view of a fourth embodiment of the multi-directional scaffold transport device.

The multi-directional scaffold device 20 may be required to support a scaffold having tools or other items atop of it or attached to it, making the overall combined weight to be supported a significant design factor. Therefore, the scaffold device 20 may preferably have vertical stiffeners 51 which may be integral, and may protrude upward from first side 26 and second side 27 of elongated flat plate 21 (FIG. 3). Many alternative embodiments that incorporate vertical stiffeners are possible. A continuous integral wall 52 may protrude vertically from the first end 24, second end 25, first side 26, and a second side 27 of first angled extension plate 30 to form a rectangular-shaped enclosure, as shown in FIG. 4. Alternatively, a continuous wall 53 may protrude vertically from only the periphery of the multi-directional transport device, and thereby protrude from first side 26 and second side 27 of elongated flat plate 21, from first tapered side 35 and second tapered side 36 of both first and second angled extension plates 30 and 40, and from elevated end 34, as shown in FIG. 5. Also, those various possible stiffener arrangements—stiffeners 51, 52 and 53—instead of being integrally formed, may comprise separate parts which are attached to the device. Shown in FIG. 2, is an embodiment where L-shaped angles 54 of different lengths are attached to the periphery of the device to provide stiffness. The attachment means of the angles 54 may include, but is not limited to, welding, and mechanical fasteners such as rivets, screws, nut and bolts, etc.

To function as an integral part of a typical scaffold, the multi-directional transport device must necessarily be fixed to the scaffolding being used at a particular construction site. A typical scaffold 11 (FIG. 7) may have a leg 12, that terminates in a base 13. While there are many possible schemes for attachment of the device to the scaffold base, including, but not limited to, welding, and mechanical fasteners such as rivets, screws, nut and bolts, etc, a preferred embodiment may incorporate threaded studs 60 into the multi-directional transport device 20 that may protrude vertically from top surface 22 of the elongated flat plate 21 (FIG. 2). They may be integral to the elongated flat plate or attached to it by any suitable means, including, but not limited to, welding the threaded studs thereon. Two or more threaded studs 60 would likely be sufficient to attach the device to the base 13 of scaffold 11, but in a preferred embodiment, four threaded studs 60 may protrude from top surface 22 of the elongated flat plate 21, and may preferably be spaced in a rectangular pattern. The pattern may preferably be centrally located so as to be approximately mid-way between first end 24 and said second end 25 of said elongated flat plate 21, and approximately mid-way between said first side 26 and second side 27. The spacing between adjacent threaded studs 60 should be sufficient to provide adequate clearance from the leg 12 of scaffold 11.

Figure 8:
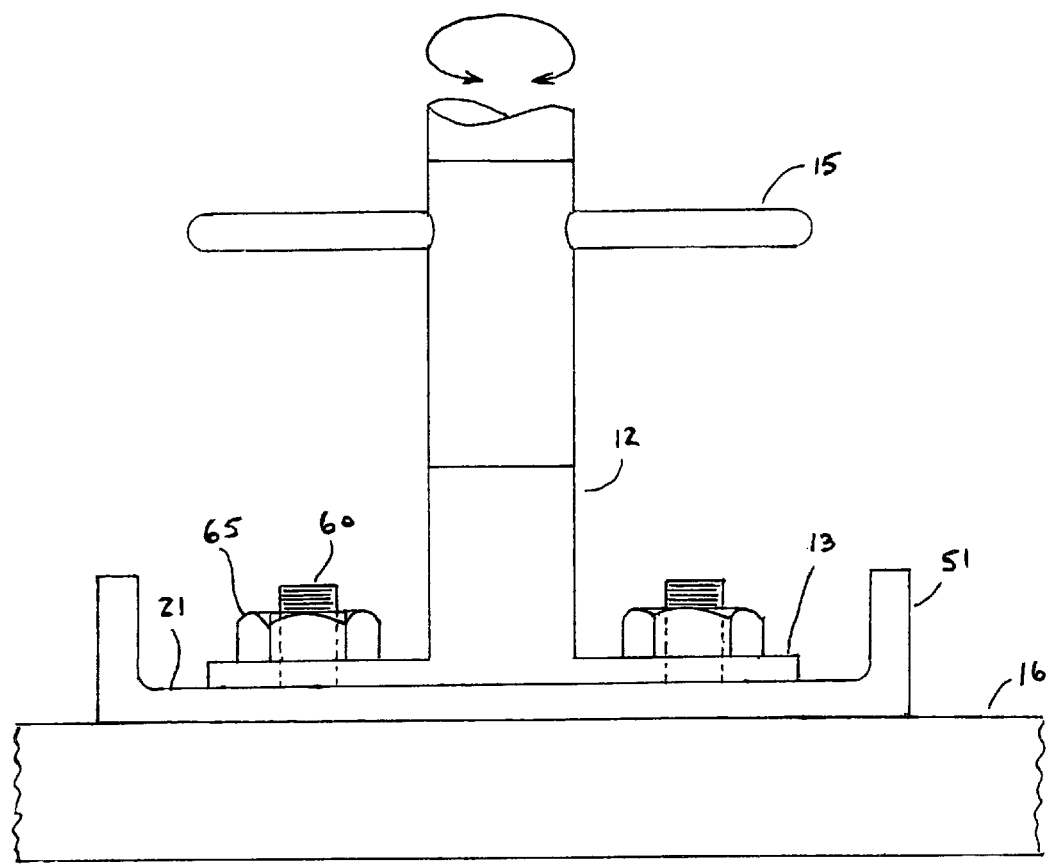
FIG. 8 is a section view of the second embodiment of the multi-directional scaffold transport device, shown attached to the base of a construction scaffold, and sitting atop the corrugated steel decking of a building's superstructure.

The base 13 of scaffold 11 may have holes 14 drilled into it to provide a clearance fit for acceptance of the studs 60. The multi-directional scaffold device 20 may then be removably attached to scaffold 11 using a conventional fastening mean including, but not limited to, standard hex nuts 65 with lock washers, jam nuts, lug nuts, wing nuts, etc (FIG. 8). The attachment scheme may alternatively incorporate a quick release fastening means for ease of assembly and disassembly onto the base 13 of scaffold 11.

Figure 9:
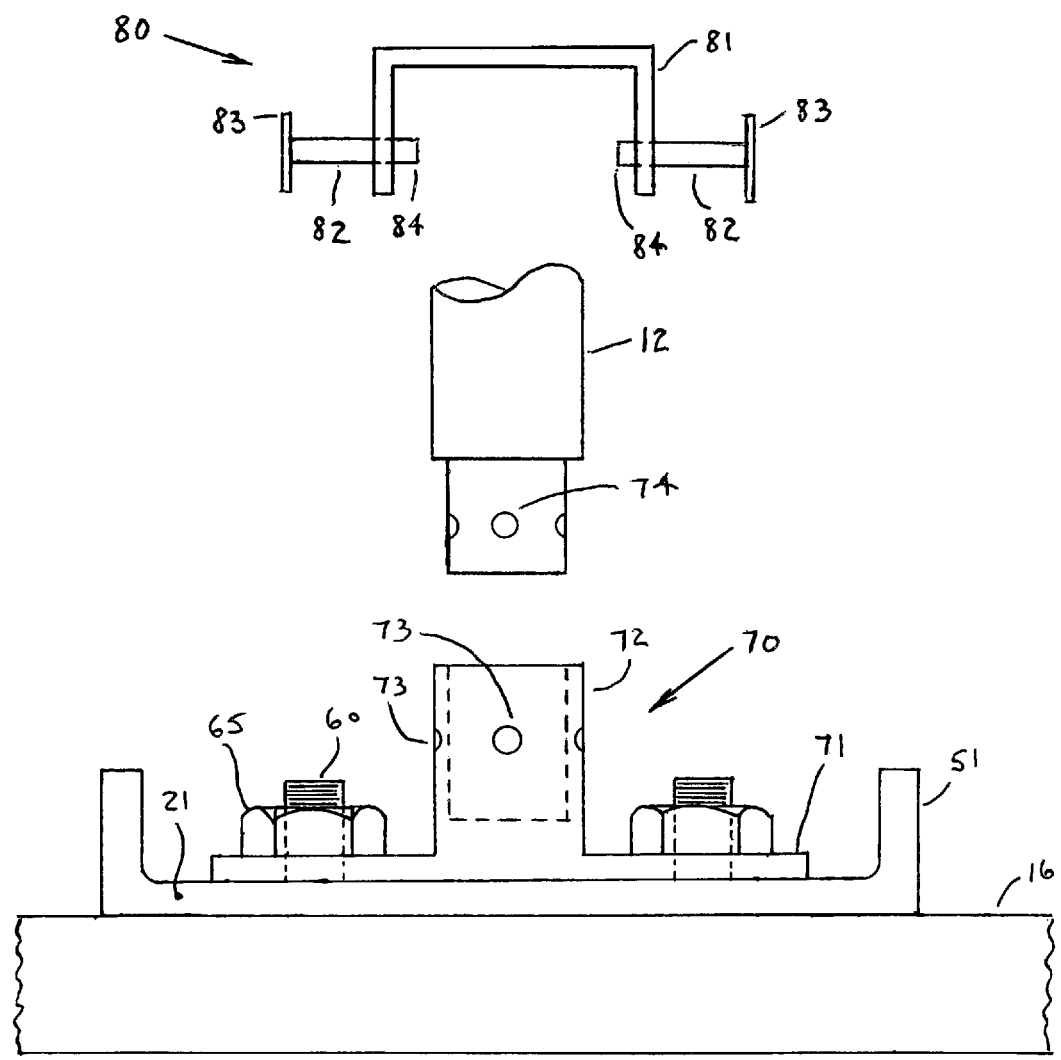
FIG. 9 is an exploded view of a modified leg and base of a scaffold.

Maneuvering of the scaffold assembly 11 would be facilitated with the multi-directional transport device attached, as in FIG. 8, to permit sliding movement of the scaffold assembly atop the exposed floor decking of a building's superstructure, as shown in FIG. 9. The relative sliding movement will occur between the bottom surface 23 of multi-directional transport device 20, and the peaks of the corrugations. The sliding motion will initially be resisted by a static frictional force, which is a threshold that must be overcome, and thereafter by a lesser sliding frictional force. The friction force resisting movement, $F_f$, is determined from the equation, $F_f = \mu \cdot F_n$, where $F_n$ is the normal force or weight of the scaffold being moved, and $\mu$ is the coefficient of friction.

A coefficient of friction is an empirical property of two materials which are contacting each other, and which provides the relative motion between the two objects. The coefficient can range from near-zero to greater than one, and rougher surfaces have higher coefficients, but most dry material in combination have friction coefficient vales between 0.3 and 0.7. For example, ice on steel has a very low coefficient, whereas a rubber tire on concrete may, under certain conditions, have a coefficient of 1.7. As the coefficient varies dramatically from material to material, this may be a consideration in the material selection for the multi-directional scaffold transport device. The corrugated decking will typically be steel, so materials having a low coefficient of friction in relation to the steel will optimize sliding movement of the scaffold. Teflon has a very low coefficient of friction, often being as little as 0.04, and as such, it is commonly used in spherical bearings.

The multi-directional transport device 20 may need to be constructed of a relatively high strength metal, but it could also be coated with a finish having a low coefficient of friction, such as Teflon, and enhance sliding movement. Additionally, although there would be a tendency to wear away a coating like Teflon because of the scaffold's considerable weight and frequent usage, adding a lubricant to the bottom surface 23, whether coated or not, would improve sliding movement as well as the device's longevity. The material selected for the multi-directional transport device 20 and any coating that may be used will also alleviate fretting between the moving surfaces.

As described previously, the length of the elongated flat plate 21 needs to be roughly as long as the straight-line distance between two peaks of the corrugations in the floor decking being utilized (FIG. 9). It should be apparent that the first and second angled extensions permit bi-directional movement of a scaffold fitted with the device, and they also serve to allow the device to climb up to the peak of a corrugation where the scaffold may be maneuvered at an angle relative to the corrugations. With adjustments to the length of the device, a preferred embodiment may traverse at 15 degree angles relative to the axis of the corrugations, or in a more preferred embodiment, traverse at 30 degree angles, but in the most preferred embodiment may traverse at angles of 60 to 90 degrees relative to the axis of the corrugations.

The device accomplishes multi-directional movement, and not simply bi-directional movement, because many scaffold assemblies incorporate a lever 15 that allow for height adjustments of a particular leg, along with rotation of the base 13, such as U.S. Pat. No. 6,722,471 to Wolfe. Rotation of the base 13 would also accomplish rotation of the axis 28 of the multi-directional transport device 20 to be re-oriented at a different angle relative to the corrugations. The re-orientation would permit a scaffold that had been pushed diagonally across the floor deck corrugations—at a 45 degree angle for example—to a position where a task was completed, to then have each leg rotated so that the scaffold could then be pushed in a direction at a 90 degree angle relative to its original path, essentially zigzagging across the decking, without having to push the heavy scaffolding along a curved path.

Although older scaffolding may not be equipped with a lever 15 to permit rotation of the scaffold base, a scaffold leg may nonetheless be fitted with a pivoting base 70 having a base plate 71 and post 72, as seen in FIG. 9. The post 72 may have one or more pairs of orifices 73 drilled in-line through the post 72, and pairs of holes may similarly be drilled in line in scaffold leg 12. The leg may then be removeably secured to the based using clamp 80, which resembles a "C"-clamp that has a "C"-shaped body 81, which threadably retains a pair of screws 82. Each screw 81 may have a handle 83 capable of accommodating rotational movement of the screw, so that when the post 71 of base 71 is inserted into the scaffold leg 13, the ends 84 of clamp 80 may be driven into the in-line holes 74 of the post and the in-line holes 73 of the base. With the scaffold so equipped, and positioned atop corrugated decking, zigzag movement may be accomplished as described for newer scaffolding, by backing out the screws 82 and rotating the base 70, so as to reorient the multi-directional transport device 20.

The maneuverability of the scaffold assembly, with the device attached to the base of each leg, may be further improved in one of several possible alternate embodiments. In one alternate embodiment, first tapered side 35 and second tapered side 36 may converge at the elevated end 34 for first and second angled extension plates 30 and 40, and rather than a flat edge surface 37 being formed, first and second tapered sides 35 and 36 may converge to create a sharp edge (not shown). This would result in the first angular extension plate 30 and the second angular extension plate 40 each generally taking the form of a triangular shape. Alternatively, instead of converging to a sharp edge at the elevated end 34, the first and second tapered sides 35 and 36 may be radiused to form a curved surface 38 (FIG. 6), which may be tangent to elevated end 34.

It can be seen that curved surface 38 may assist in maneuvering the multi-directional transport device 20, when attached to a scaffold assembly, around any of the upward protruding floor deck anchor studs. The curved surface 38 would serve to guide the device/scaffold laterally to one side or the other of a floor deck anchor stud, rather than jamming on or butting against the anchor stud.

Additionally, instead of angled extension plates 30 and 40 having a top 31 and bottom 32 which would be planar and parallel to each other (FIG. 1), they may both arch upwards whereby first angled extension plate 30 is formed by a curved top 31A and curved bottom 32A (FIG. 3). Furthermore, the top and bottom may be comprised of compound curved surfaces, whereby they may also curve upward when moving laterally from centerline 28, so that first and second angled extension plates 30 and 40 are shaped like the bow of a ship (not shown). This would further ensure that only a curved surface of the multi-directional scaffold device would contact the anchor stud, and prevent jamming against the stud, which would require the user to relocate to the side of the scaffold to jockey it sideways around the stud, rather than just pushing the scaffold from behind. It should be pointed out that the multi-directional scaffold transport device 20, as well as any alternate embodiment, may preferably be symmetrically formed relative to centerline 28.

Figure 6:
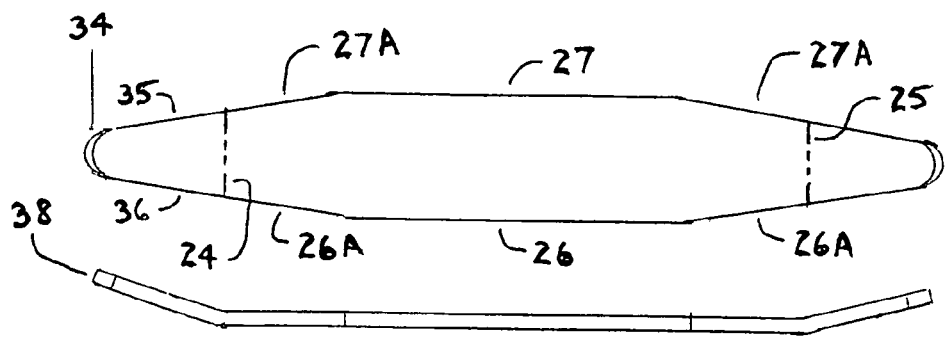
FIG. 6 is a top view and side view of a sixth embodiment of the multi-directional scaffold transport device.

Lastly, maneuvering the scaffold around the floor deck anchor studs may be further accommodated in an alternate embodiment by having elongated flat plate 21 also incorporate, into first side 26 and second side 27, tapered edges 26A and 27A respectively (FIG. 6).

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention as described in the following claims.

What is claimed is:

1. A multi-directional transport device, adapted for use atop a corrugated decking of a building superstructure, said multi-directional transport device comprising: an elongated flat plate, said elongated flat plate having a first end and a second end, a top surface and a bottom surface, said bottom surface being flat and without any steps, each of said first and second ends of said flat plate having an extension plate protruding therefrom at an acute angle with respect to a plane of said elongated flat plate, said extension plate at said first and second ends each narrowing with increasing distance from respective first and second ends, said device comprising one or more studs fixedly secured to a top surface of said elongated flat plate to protrude upwardly therefrom.

2. The multi-directional transport device according to claim 1, wherein said extension plates at said first and second ends each narrow to form a trapezoidal shape, or narrow to a point to form a triangular shape.

3. The multi-directional transport device according to claim 2, wherein said elongated flat plate further comprises one or more stiffeners, said one or more stiffeners protruding upward from said elongated plate between said first end and said second end.

4. The multi-directional transport device according to claim 3, wherein said one or more stiffeners on said elongated plate comprises a first stiffener and a second stiffener respectively located at a first side and a second side of said elongated plate.

5. The multi-directional transport device according to claim 4, wherein said extension plates at said first and second ends each further comprise one or more stiffeners configured to respectively protrude away from a top surface of said extension plates.

6. The multi-directional transport device according to claim 5, wherein said one or more stiffeners on said extension plates comprises a first stiffener and a second stiffener respectively located at a first side and a second side of said extension plates.

7. A multi-directional transport device, adapted for use atop a corrugated decking of a building superstructure, said multi-directional transport device comprising:
    an elongated flat portion, said elongated flat portion having a top surface, a bottom surface, a first side, a second side, a first end and a second end, said elongated flat portion comprising:
        a center section, said top surface and bottom surface for said center section being substantially rectangular with said first and second sides being substantially parallel at a center section of said elongated flat portion, said bottom surface of said center section being flat and without any steps therein; and
        first and second end sections, said center section transitioning into said first and second end sections at opposite ends of said center section, each of said first and second end sections comprising a substantially trapezoidal-shaped top surface and bottom surface, with said first and second sides for each of said first and second end sections thereby configured to be respectively convergent toward said first and second ends;
    first and second angled extension portions protruding respectively from each of said first and second end sections at said first and second ends of said elongated flat portion, each of said first and second angled extension portions having a top surface, a bottom surface, a first side, a second side, and an elevated end being distal from said respective first and second ends of said elongated flat portion; each said first and second sides of said first and second angular extension portions configured to converge to form a triangular shape, with a tip of said triangular shape positioned at each of said respective elevated ends; and one or more studs fixedly secured to said elongated flat portion, and configured to protrude upward and away from said top surface of said elongated flat portion, a portion of each of said one or more studs having external threads.

8. The multi-directional transport device according to claim 7 further comprising a multi-legged scaffold and a plurality of said transport device, each leg of said multi-legged scaffold comprising a base plate with one or more orifices therein configured to correspondingly receive said one or more studs of a respective said transport device.

9. The multi-directional transport device according to claim 8 further comprising means for releasably securing each said base plate of said multi-legged scaffold to said respective transport device.

10. The multi-directional transport device according to claim 7, wherein each of said first and second sides of said first and second angular extension portions converge to form a sharp edge at each said tip.

11. The multi-directional transport device according to claim 7, wherein said bottom surface of each of said first and second angled extension portions is substantially flat.

12. The multi-directional transport device according to claim 7, wherein said bottom surface of each of said first and second angled extension portions is upwardly curved.

13. The multi-directional transport device according to claim 7, further comprising an upstanding stiffener portion on each of said first and second sides of said center section of elongated flat portion.

14. The multi-directional transport device according to claim 13, further comprising an upstanding stiffener portion on each of said first and second sides of said center section of elongated flat portion and of said triangular shape of said first and second angled extension portions.

15. The multi-directional transport device according to claim 7 wherein said tip of said triangular shape of each of said first and second angled extension portions is radiused.

16. The multi-directional transport device according to claim 7 further comprising a coating material applied to said bottom surface of said elongated flat portion, said coating material adapted to provide a low coefficient of sliding friction.

* * * * *